(No Model.)
H. DEININGER.
PROCESS OF AND APPARATUS FOR AGING ALCOHOLIC LIQUIDS.
No. 584,050. Patented June 8, 1897.
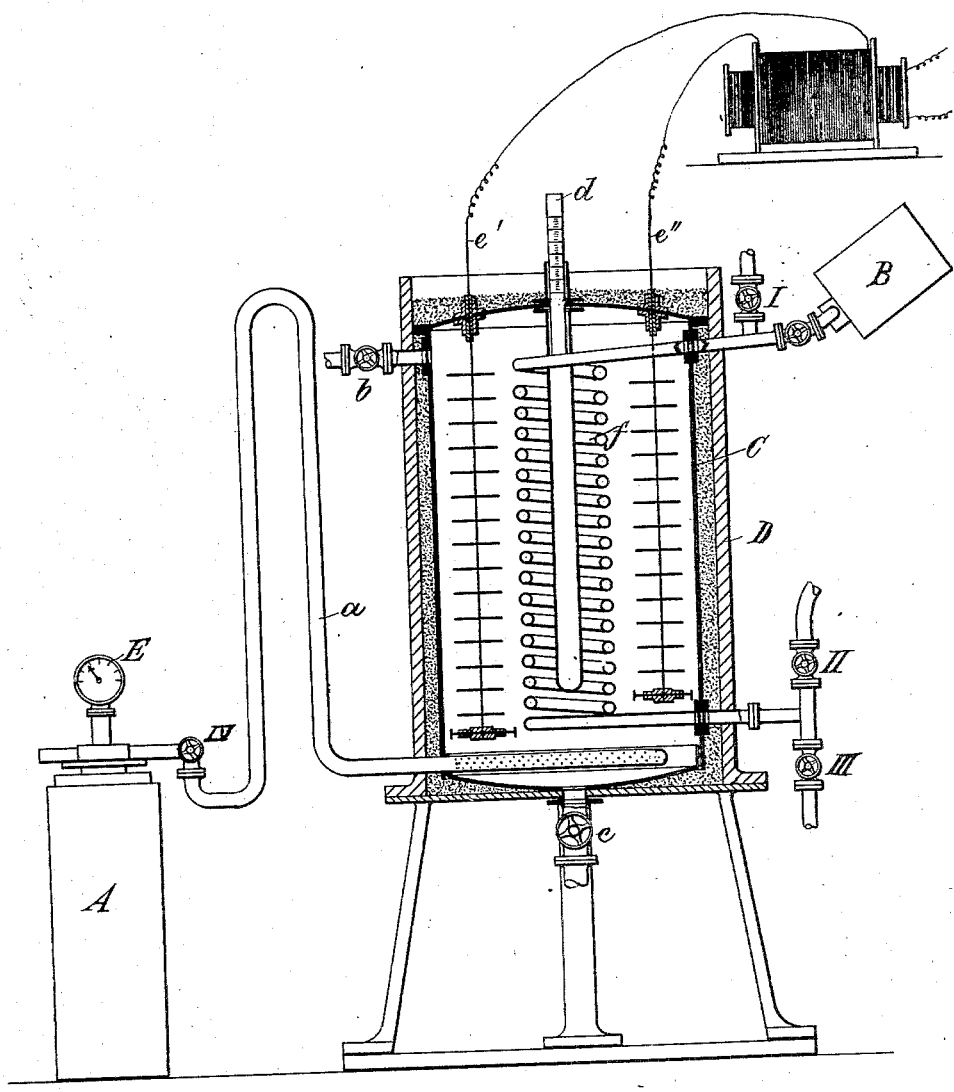
Witnesses:
M. C. Massie.
N. Mitchell
Inventor:
Heinrich Deininger
by Mastin
Attorney.

UNITED STATES PATENT OFFICE.

HEINRICH DEININGER, OF BERLIN, GERMANY, ASSIGNOR TO GOTTLOB ROBERT BESSER, OF SAME PLACE.

PROCESS OF AND APPARATUS FOR AGING ALCOHOLIC LIQUIDS.

SPECIFICATION forming part of Letters Patent No. 584,050, dated June 8, 1897.

Application filed November 1, 1895. Serial No. 567,619. (No model.) Patented in Belgium April 30, 1895, No. 115,151.

*To all whom it may concern:*

Be it known that I, HEINRICH DEININGER, chemist, a subject of the Emperor of Germany, residing at 48 Rathenowerstr., Berlin, Germany, have invented new and useful Improvements in Processes of and Apparatus for Aging Fluids Containing Alcohol, (for which I have obtained a patent in Belgium, No. 115,151, dated April 30, 1895,) of which the following is a specification.

It is axiomatic that alcoholic fluids—such as wine, cognac, rum, arrack, and the like—through the long lying in the cask are more or less advantageously improved with time. The change itself, however, is, in accordance with its causes, to be traced back to the under-named influences—change of temperature, air-pressure, and movement of the particles of the mass. These involve molecular changes in the aromatic compounds present in the spirits. The changes of temperature follow on the daily variations in the warmth of the air. These in their turn invoke expansion or contraction in the fluid mass. The specific gravity of the same is therefore increased or diminished with the variations in temperature and pressure, whence arise movement and change in the particles of the mass. With these progressive changes the absorption of acids stands in direct relationship, for that absorption depends on the pressure and temperature of the atmosphere. The air diffuses itself through the cask-staves and is absorbed by the fluid contained in the cask. The oscillations (molecular oscillations) of the particles of the liquid mass take place during storage at a very slow rate, and, moreover, the effect or the result of the storage is dependent on the nature of the means of storage. Deficiency of clean-tempered air holding sufficient acid materially affects the aging process. On the other hand, it is frequently remarked that prolonged transport, where molecular oscillations, consequent upon the above-specified causes and upon enduring shocks and commotion, are materially promoted and accelerated, greatly improve the article.

In order to promote an acceleration in the aging of alcohol-containing liquids, various methods have been suggested, which, however, invariably more or less fail from a want of comprehension of the subject-matter. The process of molecular change is not so simple that it will suffice merely to force filtered warmed air through the liquid in question; also nascent oxygen would not evoke any considerable change, and, similarly, the effect that would be produced by subjecting the liquid to an extremely-low temperature stands in no sort of relation to the power that would be required. I, however, now propose the following process in order to invoke molecular oscillations of considerable importance and effect in such a liquid. Oxygen taken from a receptacle of oxygen gas in which it is stored at a pressure of about one-fourth or one-half an atmosphere in excess of atmospheric pressure and at a temperature of from 15° to 20° centigrade is conducted into the alcohol-containing fluid to be treated. Some of the oxygen is dissolved and absorbed in such fluid. The coefficient of solution is known to be inconsiderable. Its value for water is at 0° centigrade 0.04114; at 20° centigrade 0.02838. For pure alcohol it is constant, at these temperatures, viz., 0.28397. When the fluid is saturated, the valve of the oxygen-bottle is closed. Thereupon, by means of an induction-coil or otherwise, alternate or reversed currents are passed through the liquid. The instrument best adapted for that purpose is Lewandowcki's slide induction apparatus. Nevertheless any other inductorium can be used at pleasure, provided only that there is the means of making the change necessary to evoke the alternate or reversed currents.

The influence of the current is expressed as as follows: While the absorbed oxygen becomes active, molecular oscillation is simultaneously set up in the liquid. These manifestations are accompanied by heat-developments, which must be kept under control by the aid of an extremely-sensitive thermometer. As is known the ethyl alcohol offers considerable resistance to the electric current, its chemical constitution is not so easily disturbed. Thus the effect of the current after the oxygen has become active is chiefly devoted to the conversion of the aldehyde present. Acids present and formed will, with the aldehyde alcohol, as soon as the molecular oscillation is set up by the current, generate composite ethers, in this case ethers of various constituents—aromatic compounds.

The homologous alcohols—viz., butylic, propylic, and amylic alcohols (butyl alcohol, propyl alcohol, and amyl alcohol)—are converted in the exact proportion of their powers of attack. They are considerably more active and reactive agents than ethyl alcohol. They may be regarded as being held in the finest conceivable state of division in the alcohol-containing liquid. The attack therefore takes place first in this direction, and thus these homologous alcohols are altered in constitution. The oxygen present, absorbed in the liquid and rendered active by the electric current, is utilized by entering directly into the molecular constitution of the homologous alcohols. Considered collectively the work is done on this principle, with the smallest possible expenditure of power. Thus oxygen is absorbed by the fluid, because being present in the free state it does not first need separation or generation by electrical power, but is only rendered active thereby. The force required for the absorbed oxygen is for this purpose extremely small. It is known from recent researches—viz., that oxygen which is absorbed by charcoal from wood or bones (i. e., vegetable or animal charcoal) is directly active. Dyes or pigments are oxidized by such charcoal. The charcoal alone does not possess this power. The decoloring action was for some time, previously to that fact becoming known, attributed to the specific action of the charcoal only.

In proportion to the degree of work done is heat given off by the effect of the chemical energy, as well as of the electric current, as is shown by the thermometer. The rise of temperature serves to measure the working developed. As soon as, after the commencement of operations, the rise of 1° centigrade in the liquid is indicated the electric current must be lowered and the liquid cooled down by liquid carbonic acid, which is allowed to flow throughout the mass by means of a worm. The cooling takes place at once, as the liquid carbonic acid absorbs heat rapidly from the liquid through which it flows. The apparatus is to be protected by insulation from all outward atmospheric changes of temperature.

The spirituous liquors show a different standard, according to their quality, in relation to the strength and duration of the electric current, as also the temperature of the liquid. One is frequently compelled to allow the work to be done with a reduced current, for a longer period, and at a very low temperature.

The operation is generally commenced at from +15° to 20° centigrade. Should the fluid not have that temperature, it is raised to it by steam. After working for several hours the current is slackened off, and simultaneously the temperature is reduced to about −15° centigrade by cooling down, as above described. The progress of the work is determined by taking samples. The temperature plays its part in the development so far as the chemical affinity of the combination developed by the electrolysis is concerned.

The apparatus serving for the carrying out of the process is represented in the accompanying drawing.

The oxygen-flask A is provided with a reducer E, in order to reduce the pressure of the gas. The gas is led through a valve IV and a communicating-pipe $a$ into the hermetically-closed receptacle C, filled with the liquid to be treated. The filling thereof takes place through $b$, its emptying by $c$. For the purpose of regulating the temperature the cylinder or receptacle C contains the worm $f$, which is in communication at its upper end with the bottle B, charged with liquid carbonic acid, so as to admit of the temperaturre being lowered to any desired degree. The exit of the liquid carbonic acid takes place at valve III. Through valve II steam is admitted in case of heat being required. The condensed water from the steam is drawn off through valve I. During this period valves III and IV are of course kept closed. When the heating is finished, valve III is opened, in order to let off the remaining condensed water in the worm.

For the insulation of the apparatus the cylinder C is fitted with a jacket D, and the space intervening between C and D is filled with silicious earth (kieselguhr) or the like. On the cover of the cylinder C is the thermometer $d$, which dips down as far as possible inside the cylinder. The conducting-wires $e'$ $e''$ (from the poles of the inductorium) pass through insulators $c'$ $c''$ in the cylinder-cover, which are made of thick porcelain or glass tubes. The tubes are made with a central metallic through-communication of about twenty millimeters in length, each comprising a copper lining $c^3$, formed or deposited by electrolysis. This being workable may be secured within its respective tube or insulator by solder applied above and below the insulator.

The pole conductors passing through the linings $c^3$ of the tubes are held therein by a layer of enamel of any suitable and easily-fusible kind. By reason of this construction there is no connection between the wires and the metal of the cylinder, so that the current must flow directly through the liquid. The wires enameled to the insulators are formed of platinum and are placed in communication with the inductorium by screw connections or binding-clamps. The connection of these platinum wires with the conductors which dip into the liquid is made in the customary well-known manner. These conductors are constructed with a number of lateral branches projecting from them, and in order to protect them from oxidation they are constructed of one of the nobler metals, preferably silver.

Having now particularly described and ascertained the nature of my invention and in what manner the same is to be performed, I declare that what I claim, and desire to secure by Letters Patent, is—

1. A process for aging alcohol-containing liquids, which consists in first impregnating the liquid with oxygen, then setting up molecular oscillations within it, and simultaneously subjecting it to a temperature below the normal, substantially as set forth.

2. A process for aging alcohol-containing liquids, which consists in first impregnating the liquid with oxygen, and then subjecting it to the action of an alternating current of electricity.

3. A process for aging alcohol-containing liquids, which consists in first impregnating the liquid with oxygen, then simultaneously subjecting it to the action of an alternating electric current and to a low temperature, substantially as set forth.

4. A process for aging alcohol-containing liquids, which consists in first impregnating the liquid with oxygen, then transmitting alternating electric currents through the impregnated liquid, and simultaneously subjecting it to a temperature between $-15°$ and $+20°$ centigrade, substantially as set forth.

5. In an apparatus for aging alcohol-containing liquids, the combination, with a closed receptacle, an oxygen-flask, a reducing-valve connected to the said flask, a pipe communicating with the valve and provided with a perforated end projecting into the lower end of the receptacle, a cooling-coil extending into the receptacle, a pair of electrodes located within said receptacle, and means for supplying alternating currents to said electrodes, substantially as set forth.

In testimony whereof I have signed my name to this specification in the presence of two subscribing witnesses.

HEINRICH DEININGER.

Witnesses:
 WM. HAUPT,
 CHAS. H. DAY.